United States Patent
Shanmugam et al.

(10) Patent No.: US 12,450,867 B2
(45) Date of Patent: Oct. 21, 2025

(54) IMAGE PROCESSING SYSTEM FOR CAMERA MONITORING SYSTEM

(71) Applicant: Stoneridge Electronics AB, Solna (SE)

(72) Inventors: Dinesh Bharathi Shanmugam, Chennai (IN); Arunshankar Muruga Dhandayuthapany, Auburn Hills, MI (US); Banuprakash Murthy, Novi, MI (US); Troy Otis Cooprider, White Lake, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 377 days.

(21) Appl. No.: 18/082,865

(22) Filed: Dec. 16, 2022

(65) Prior Publication Data

US 2024/0203088 A1    Jun. 20, 2024

(51) Int. Cl.
*G06K 9/00* (2022.01)
*G06V 10/56* (2022.01)

(52) U.S. Cl.
CPC .................... *G06V 10/56* (2022.01)

(58) Field of Classification Search
CPC ...... G06V 10/56; H04N 23/86; G06T 3/4015; G06T 5/009; G06T 5/20; G06T 7/90; G06T 2207/10024; G06T 2207/20208
See application file for complete search history.

(56) References Cited

U.S. PATENT DOCUMENTS

| | | |
|---|---|---|
| 5,671,022 A | 9/1997 | Ishida |
| 6,034,667 A | 3/2000 | Barrett |
| 6,466,220 B1 * | 10/2002 | Cesana .................. G09G 5/393 345/603 |
| 2005/0225522 A1 | 10/2005 | Wu et al. |
| 2012/0170843 A1 * | 7/2012 | Lin .......................... G06T 5/94 382/167 |
| 2013/0011076 A1 * | 1/2013 | Obzhirov ............... H04N 19/34 382/251 |
| 2013/0176489 A1 * | 7/2013 | Yamaguchi ........ H04N 21/4325 348/453 |
| 2015/0023594 A1 * | 1/2015 | Zhang .................. H04N 23/741 382/167 |
| 2022/0103825 A1 | 3/2022 | Rusanovskyy et al. |

FOREIGN PATENT DOCUMENTS

| | | |
|---|---|---|
| EP | 3798967 A1 | 3/2021 |
| WO | 8101065 A1 | 4/1981 |

OTHER PUBLICATIONS

International Search Report and Written Opinion for International Application No. PCT/US2022/053139 mailed Jul. 4, 2023.
International Preliminary Report on Patentability for International Application No. PCT/US2022/053139 mailed Jun. 26, 2025.

* cited by examiner

*Primary Examiner* — Duy M Dang
(74) *Attorney, Agent, or Firm* — Carlson, Gaskey & Olds, P.C.

(57) ABSTRACT

A method for processing a digital image includes receiving an image from a camera, inverting color data of the image, and bit shifting each pixel in the image such that a total bits per color (BPC) of each pixel is reduced while maintaining data elements of the image. The bit shifted image is provided to a computer vision system.

13 Claims, 4 Drawing Sheets

IMAGE PROCESSING SYSTEM FOR CAMERA MONITORING SYSTEM

TECHNICAL FIELD

This disclosure relates to a camera monitoring system (CMS) for a vehicle, and specifically to a method for processing digital images to reduce computational load in the CMS.

BACKGROUND

Camera monitoring systems (CMS), such as mirror replacement systems, and camera systems for supplementing mirror views, are utilized in vehicles to enhance the ability of a vehicle operator to see a surrounding environment. CMS utilize one or more cameras to provide an enhanced field of view to a vehicle operator. In some examples, the camera systems cover a larger field of view than a conventional mirror, or include views that are not fully obtainable via a conventional mirror. In other examples, the CMS provides image analysis that can be used for driver assistance systems and for automated or semi-automated vehicle operations.

The images provided via the cameras in the CMS can be utilized by the processors in the CMS to detect aspects of the environment and aspects of the vehicle in an image-processing-based detection process. The image-processing-based perception is computationally intensive, and time consuming.

SUMMARY OF THE INVENTION

An exemplary method for processing a digital image includes receiving an image from a camera, inverting color data of the image, bit shifting each pixel in the image such that a total bits per color (BPC) of each pixel is reduced while maintaining data elements of the image, and providing the shifted image to a computer vision system.

In another example of the above described method for processing a digital image bit shifting each pixel comprises reducing the total BPC of each pixel by a predefined number of pixels.

In another example of any of the above described methods for processing a digital image bit shifting each pixel comprises reducing the total BPC of each pixel from 8 BPC to 4 BPC.

Another example of any of the above described methods for processing a digital image further includes iterating the method of claim 1 for a set of sequential images in a video feed.

In another example of any of the above described methods for processing a digital image bit shifting each pixel in the image such that the total BPC of each pixel is reduced comprises adjusting a number of BPC by which each pixel is reduced based on a feedback loop for each sequential image in the set of sequential images.

In another example of any of the above described methods for processing a digital image inverting the color data comprises performing a non-linear logarithmic transformation on pixel bit depth data using a log n (x) formula where N is a log base value in the range of 2-10.

In another example of any of the above described methods for processing a digital image bit shifting each pixel in the image comprises shifting image detail bits from a most significant image bit to a least significant image bit.

In another example of any of the above described methods for processing a digital image the shifted image includes sufficient data elements to perform at least one operation of the computer vision system.

In another example of any of the above described methods for processing a digital image the data elements include contrast and edge lines.

In another example of any of the above described methods for processing a digital image the shifted image includes reduced color and/or pattern data.

In one exemplary embodiment a Camera monitoring system (CMS) for a vehicle includes at least one camera providing a video feed to a CMS controller, the CMS controller including a memory storing instructions for causing the CMS controller to perform a video feed pre-processing method configured bit shift each pixel in the video feed such that a total bits per color (BPC) of each pixel is reduced while maintaining data elements of the image, and provide the reduced BPC video feed to at least one computer vision system.

In another example of the above described CMS for a vehicle the CMS controller is further configured invert color data of the video feed prior to performing the bit shifting.

In another example of any of the above described CMSs for a vehicle inverting the color data comprises performing a non-linear logarithmic transformation on pixel bit depth data.

In another example of any of the above described CMSs for a vehicle the video feed is an RGB 888 video feed.

In another example of any of the above described CMSs for a vehicle bit shifting each pixel in the video feed comprises shifting the video feed from the RGB 888 video feed to an RGB 444 video feed.

In another example of any of the above described CMSs for a vehicle bit shifting each pixel in the video feed comprises reducing the video feed from the RGB 888 to an RGB feed have pixel size less than 8 bits, and wherein the resultant pixel size is variable.

In another example of any of the above described CMSs for a vehicle the resultant pixel size is controlled via a feedback loop including the bit shifting operation and a feedback output from the computer vision system.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
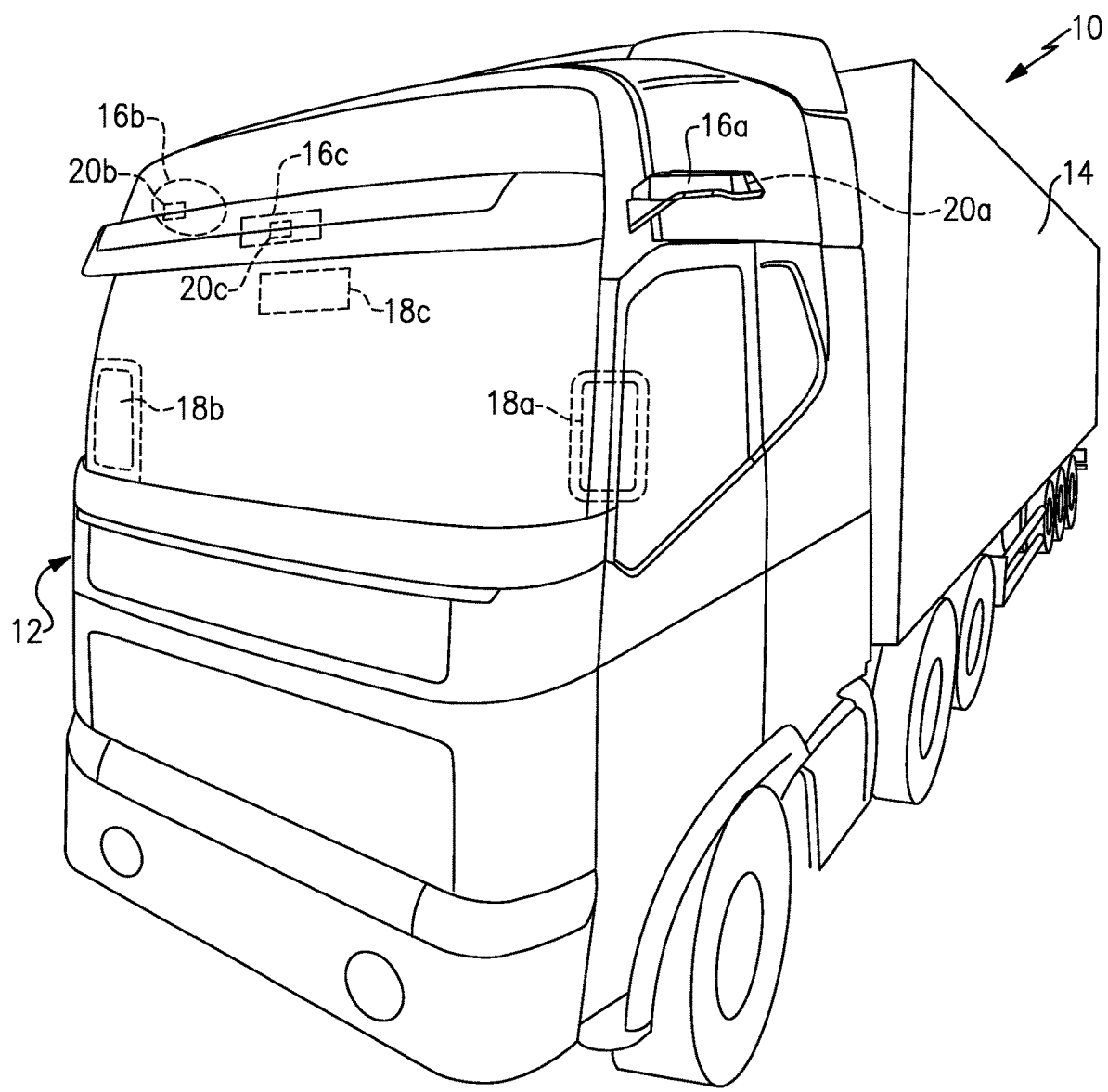
FIG. 1A is a schematic front view of a commercial truck with a camera monitoring system (CMS) used to provide at least Class II and Class IV views.
Figure 1B:
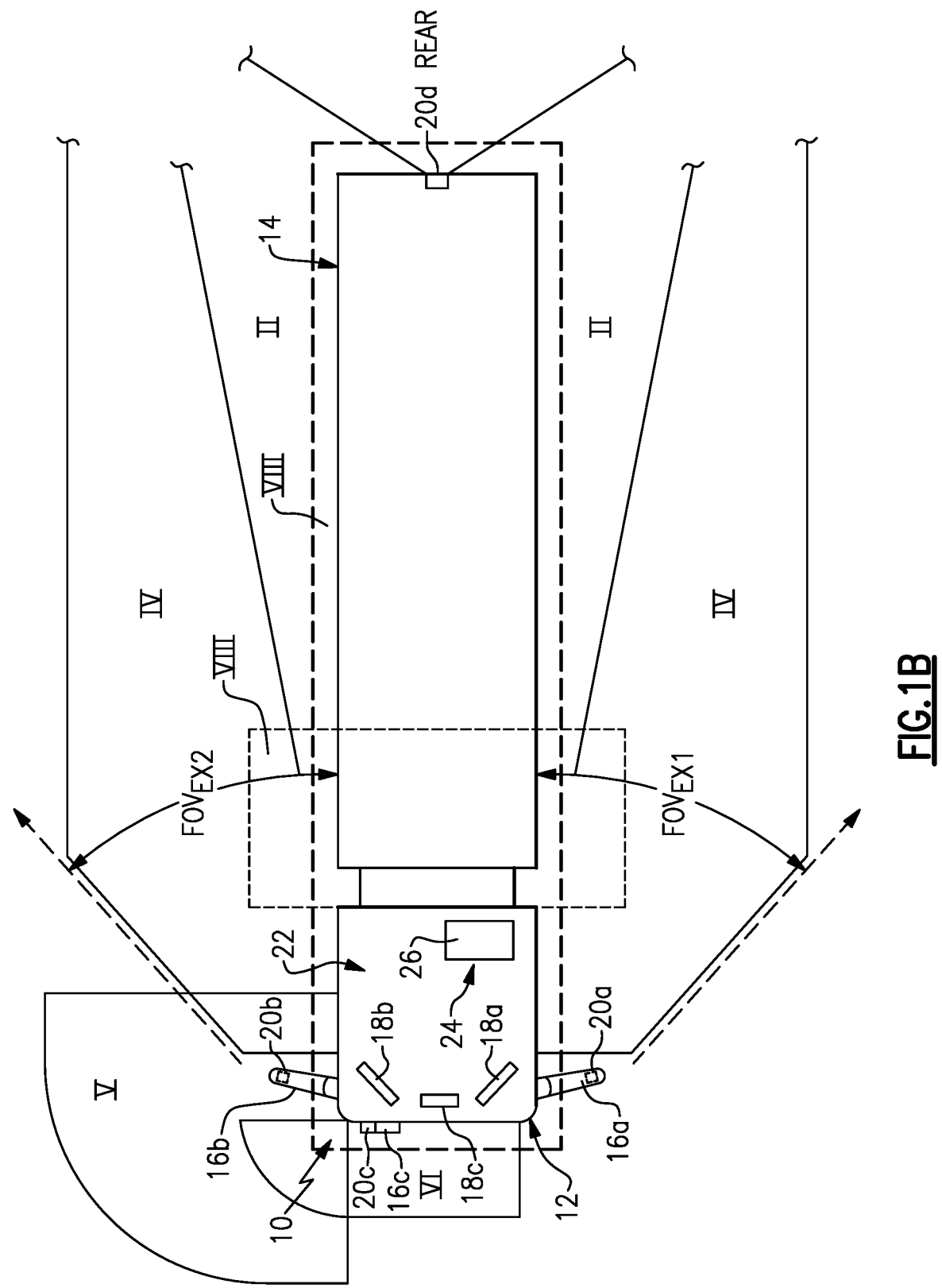
FIG. 1B is a schematic top elevational view of a commercial truck with a camera monitoring system providing Class II, Class IV, Class V and Class VI views.
Figure 2:
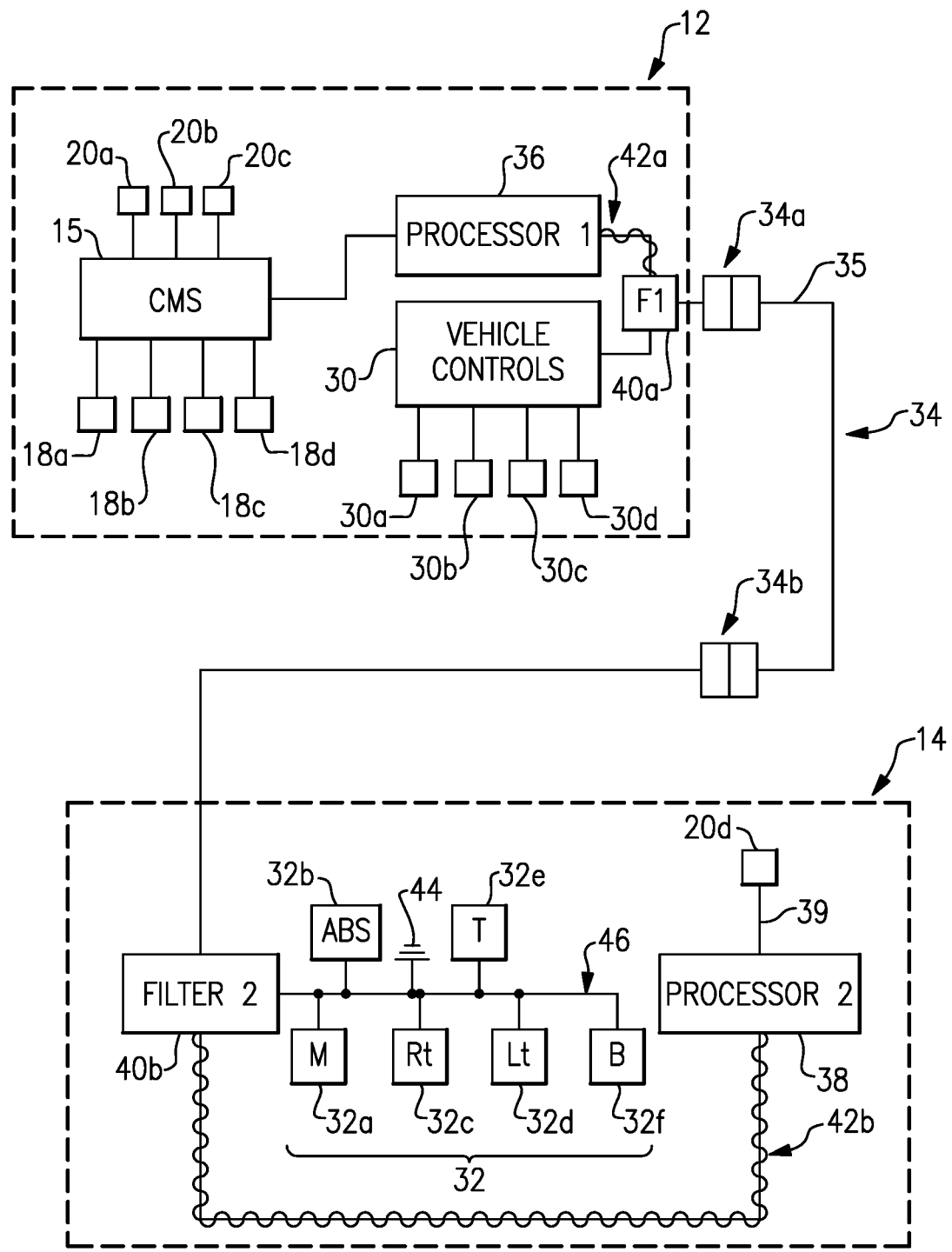
FIG. 2 is a schematic top perspective view of an vehicle cabin including displays and interior cameras.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

In one example, in addition to the cameras 20a, 20b in the camera arms 16a, 16b, the CMS includes at least a rear facing camera 60, and an internal trailer camera 62. The rear facing camera 60 captures a view of the exterior of the trailer 14, while the interior camera 62 captures a view of the interior of the trailer 14, including objects that are loaded into the trailer 14. In alternate examples, either camera 60, 62 can be a camera incorporated in a secondary system connected to the CMS 15, and configured to provide video feed to the controller 15, and the following description can function similarly.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

The CMS 15 uses the images generated by the cameras 20a, 20b, 20c for both mirror replacement/supplement views and for object detection and driver assistance features. While the mirror replacement/supplement views require color and pattern data for the vehicle operator, it is appreciated that for edge detection, automated driver assistance systems, object detection, as well as other digital image analysis, certain image aspects and characteristics that humans rely on for differentiating objects (e.g., color variations and patterns) do not benefit for the computer analysis. This is true because machines such as computer processors do not "see" images the way humans see the images. Rather, machines see contrast(s) between objects and features, and utilize those contrasts to analyze the image.

In existing systems, image enhancement and modification is typically configured with human vision in mind. As a result, the enhancement techniques are designed to maintain and enhance colors and patterns that are helpful in human analysis. These colors and patterns usually provide little, if any, benefit to computer analysis and techniques that maintain or enhance them are wasted. In another phrasing of this concept, the enhancement techniques used by existing systems are aesthetic and detail focused while computer analysis systems are data focused.

In contrast to the existing enhancement techniques, the CMS 15 described herein uses an image processing method that reduces a bit size of each pixel in the image by reducing pixel quantization levels. Reducing the bit size of each pixel enables quicker processing of video frames, at a lower computational load, using edge contrast transfer functions and similar computer analysis. The reduced pixel quantization is achieved by shifting detail bits from a higher end of an image spectrum (a most significant bit) to a lower end of the image spectrum (a least significant bit) by compressing color data. This shift reduces the amount of data contained within each pixel without removing or altering the image details, such as contrast, required from the CMS based digital analysis.

Figure 3:
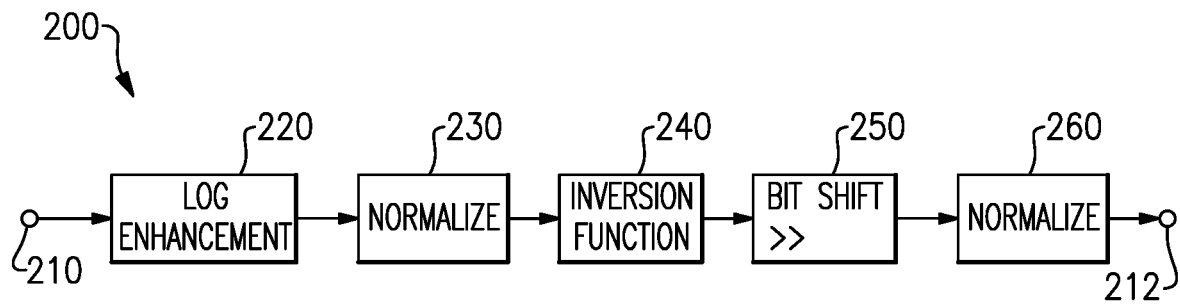
FIG. 3 illustrates an image processing method configured to pre-process an image for use with computer vision systems.

With continued reference to FIGS. 1-2, FIG. 3 schematically illustrates a high level process flow of the method 200 for converting RGB 888 (Red Green Blue images with 8 bits per color) image inputs 210 from a video source to the CMS 15 to RGB 444 (Red Green Blue image with 4 bits per color) images 212 to be analyzed by one or more controllers and processes in the CMS 15.

Initially the RGB 888 image 210 is processed using an image enhancement portion 220, that tone maps the image. Tone mapping is a technique used in image processing and computer graphics to map one color, or set of colors, to another. Typically tone mapping is used in image for human vision to approximate the appearance of high-dynamic color range images within a medium that has a more limited dynamic range. The tone mapping algorithm compresses a top band of data and a bottom band of data for each pixel into the middle band, while still maintaining distinct separations between objects. This compression effectively condenses color within the image without substantially altering contrast data. The tone mapping results in less color variation and can result in loss of pattern detail in the image.

The tone mapping algorithm initially performs a non-linear logarithmic transformation on the pixel bit depth data. In the tone mapping algorithm, the Image signals are compressed using a log n (x) formula. N is the log base values usually 2-10. Each step increases the compression. X is the image signal values of each pixel. The non-linear logarithmic transformation preserves the lower bit values and compresses the high bit depth values (e.g. the top and bottom bands) while keeping the middle spectrum of bits spread according to a linear model.

After applying the tone mapping, the image is normalized using a normalization function. The normalization includes converting the log converted image values back to full bit image values.

The output of the normalization function 230 is provided to an inverter 240. The inverter 240 inverts the color values of the image by inverting the data according to M=(N−255); N>=0 where M is the inverted output and N is the logarithmic input (i.e., the normalized value of the output of the enhancement process 220.) The inversion function highlights the edge information within the image and clips out non-essential color information from the image, as the non-essential information typically occupies top order bits in typical image processing formats.

Figure 4:
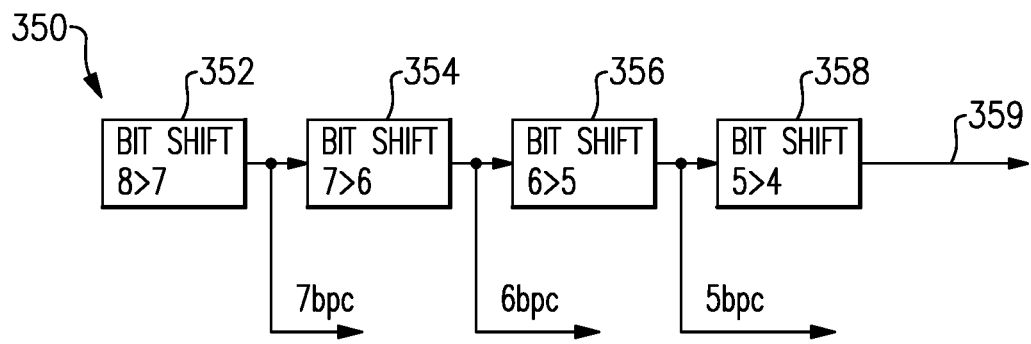
FIG. 4 schematically illustrates a bit shifting process for reducing a bit per color (BPC) size of an image to a predetermined amount within the method of FIG. 3.

After inverting the image data, high frequency data is removed from the image using a bit shift process 250. The bit shift process 250 reduces the number of quantization levels in each pixel for the RGB image from 8 bpc to as few bits as possible while still retaining the data elements (E.G., contrast and edge information) of the image. FIG. 4 illustrates a first example 350 of this process that reduces the bit size of the image by a predefines amount. The process 350 begins by shifting bpc to 7 bpc at shift 352. The shift is iterated reducing from 7 to 6 bpc (shift 354), 6 to 5 bpc (shift 356) and 5 to 4 bpc (shift 358). The output 359 is a four bpc image value, which is then normalized again in a normalization process 260 (illustrated in FIG. 3).

Each bit shift 352, 354, 356, 358, reduces the image luminosity level while preserving all the required information data from an image that can be used to detect objects and people in the environment. With three channel inputs (RGB) enough meaningful redundant data is retained to fully operate all computer based vision processing systems. Human centric information, such as color gradient and pattern is reduced or eliminated, however this reduction doesn't impact the ability of computer based vision systems to function.

Figure 5:
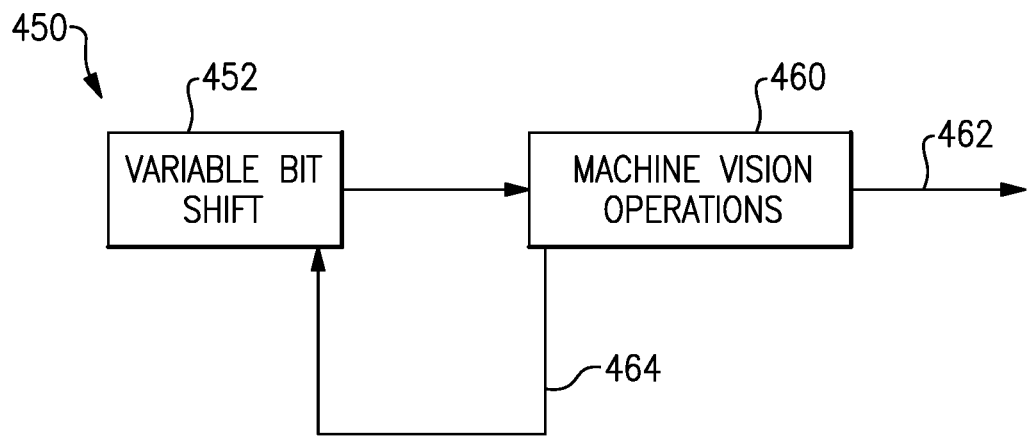
FIG. 5 schematically illustrates a bit shifting process for reducing a bit per color (BPC) size of an image by a variable amount within the method of FIG. 3.

In some examples, such as the bit shift operation 450 illustrated in FIG. 5, a feedback loop can be implemented allowing for the amount of the bit shift 250 to be variable, rather than predefined at four shifts as is illustrated in FIG. 4. With the variable bit shift process 450, the process initially performs a sequential bit shift 452 operation for a predefined bpc reduction, as illustrated in the example of FIG. 4. The output of the bit shift operation 450 is provided to a machine vision operation 460 which uses the image. The machine vision operation 460 analyzes the image using any conventional computer based image analysis technique(s) and provides a conventional output 462 corresponding to the analysis technique(s).

In addition to the conventional output 462, the machine vision system 460 provides a feedback output 464 to the variable bit shift operation 450. In one example, the feedback output 464 can be one of three states: high, low, or good. A high state indicates that the resolution provided to the machine vision operation 460 is higher than necessary and additional bit shifting can occur in each sequential operation of the bit shifting process 460. A low state indicates that the resolution provided is low enough that data elements have been lost due to too much bit shifting and the variable bit shift operation should perform less bit shifting. A good state indicates that the amount of bit shifting should not be increased or decreased. The amount of the shift performed by the bit shift operation 450 is then adjusted according to the state of the feedback signal 464.

In yet further variations on the feedback loop 464 illustrated in FIG. 5, the high or low states can be accompanied by a magnitude indicating how high or how low the resolution is compared to a good level, and the magnitude of the feedback loop impacts the number of bit shifts added or removed from the next iteration of the bit shift process 460.

Although an example embodiment has been disclosed, a worker of ordinary skill in this art would recognize that certain modifications would come within the scope of the claims. For that reason, the following claims should be studied to determine their true scope and content.

What is claimed is:

1. A method for processing a digital image comprising:
    a) receiving an image from a camera;
    b) inverting color data of the image;
    c) bit shifting each pixel in the inverted color data image such that a total bits per color (BPC) of each pixel is reduced while maintaining data elements of the image;
    d) providing the bit shifted image to a computer vision system; and
    wherein the bit shifting includes adjusting a number of BPC by which each pixel is reduced based on a feedback loop of steps a) to d) for each sequential image in a set of sequential images.

2. The method of claim 1, wherein bit shifting each pixel comprises reducing the total BPC of each pixel by a predefined number of pixels.

3. The method of claim 2, wherein bit shifting each pixel comprises reducing the total BPC of each pixel from 8 BPC to 4 BPC.

4. The method of claim 1, wherein inverting the color data comprises performing a non-linear logarithmic transformation on pixel bit depth data using a log n (x) formula where N is a log base value in the range of 2-10.

5. The method of claim 1, wherein bit shifting each pixel in the image comprises shifting image detail bits from a most significant image bit to a least significant image bit.

6. The method of claim 1, wherein the bit shifted image includes sufficient data elements to perform at least one operation of the computer vision system.

7. The method of claim 1, wherein the data elements include contrast and edge lines.

8. The method of claim 6, wherein the bit shifted image includes reduced color and/or pattern data.

9. A camera monitoring system (CMS) for a vehicle comprising:
    at least one camera providing a video feed to a CMS controller;

the CMS controller including a memory storing instructions for causing the CMS controller to perform a video feed pre-processing method configured to invert color data of the video feed then bit shift each pixel in the video feed such that a total bits per color (BPC) of each pixel is reduced while maintaining data elements of the image, and provide the reduced BPC video feed to at least one computer vision system, wherein the resultant pixel size is controlled via a feedback loop including the bit shifting operation and a feedback output from the computer vision system.

10. The CMS of claim 9, wherein inverting the color data comprises performing a non-linear logarithmic transformation on pixel bit depth data.

11. The CMS of claim 9, wherein the video feed is an RGB 888 video feed.

12. The CMS of claim 11, wherein bit shifting each pixel in the video feed comprises shifting the video feed from the RGB 888 video feed to an RGB 444 video feed.

13. The CMS of claim 11, wherein bit shifting each pixel in the video feed comprises reducing the video feed from the RGB 888 to an RGB feed have pixel size less than 8 bits, and wherein the resultant pixel size is variable.

* * * * *